Sept. 16, 1952 W. MacKENZIE 2,610,459
APPARATUS FOR HARVESTING SEAWEED UNDER WATER
Filed Dec. 28, 1949 3 Sheets-Sheet 3

Inventor:
WILLIAM MACKENZIE
By Richardson, David and Nordon
Attorneys

Patented Sept. 16, 1952

2,610,459

UNITED STATES PATENT OFFICE 2,610,459

APPARATUS FOR HARVESTING SEAWEED UNDER WATER

William MacKenzie, Edinburgh, Scotland, assignor to Scottish Seaweed Research Association, Edinburgh, Scotland Application December 28, 1949, Serial No. 135,487
In Great Britain December 31, 1948

11 Claims. (Cl. 56—8)

This invention relates to apparatus for harvesting seaweed under water and is especially applicable to harvesting sub-littoral seaweed, for example of the Laminaria species.

In accordance with the invention the apparatus comprises in combination, grapnel means adapted to engage the weed, and skid means therefor, whereby, when the combination is dragged over the seabed, the skid means mitigates fouling on the sea bed, while the grapnel means engages the weed and tears it away from the sea bed.

The apparatus is preferably towed by a surface vessel and is alternately lowered on to the sea bed and lifted therefrom as soon as sufficient weed is collected.

The vessel may be equipped, for example, with a plurality of derricks and a corresponding number of apparatus which are alternately raised for emptying and lowered for dragging on the sea bed.

An embodiment of the invention will now be described, by way of example, with reference to the accompanying drawings, in which.

Figure 1:
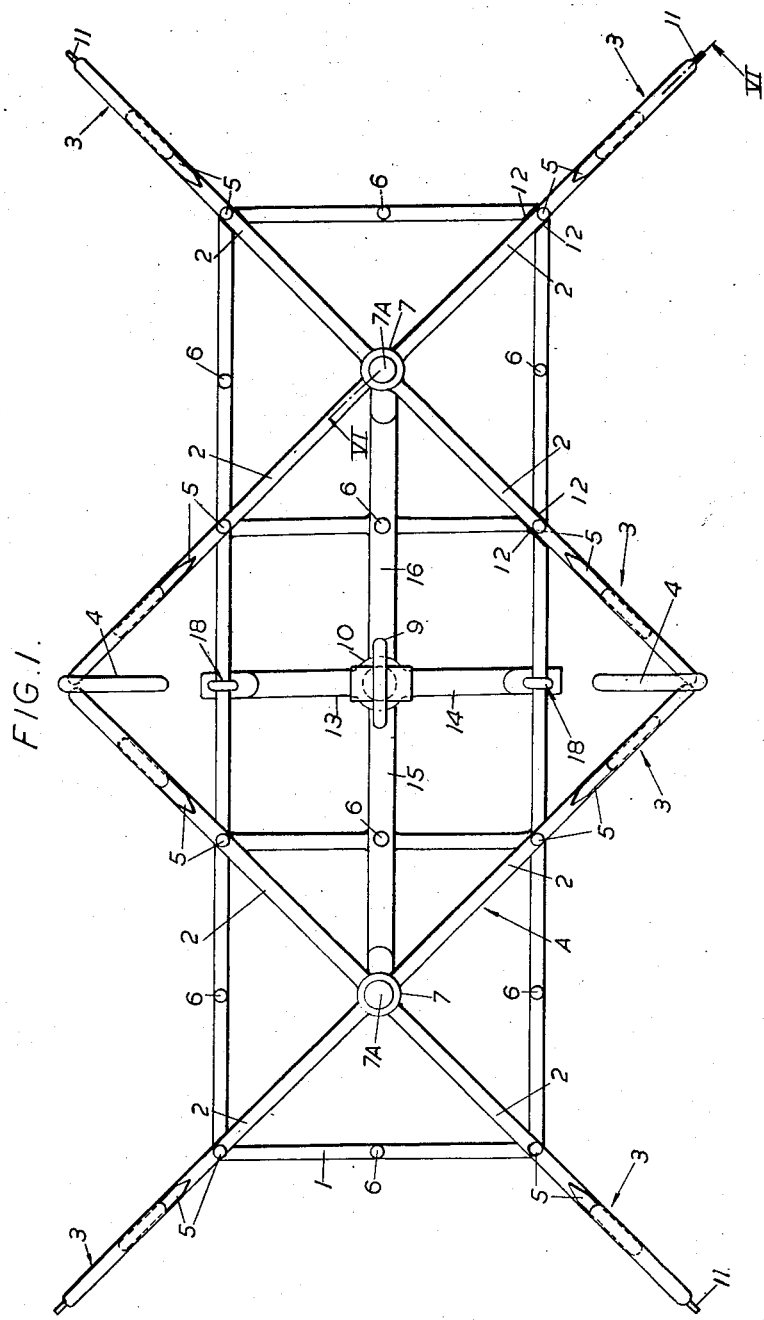
Fig. 1 is a front elevational view of the apparatus.
Figure 2:
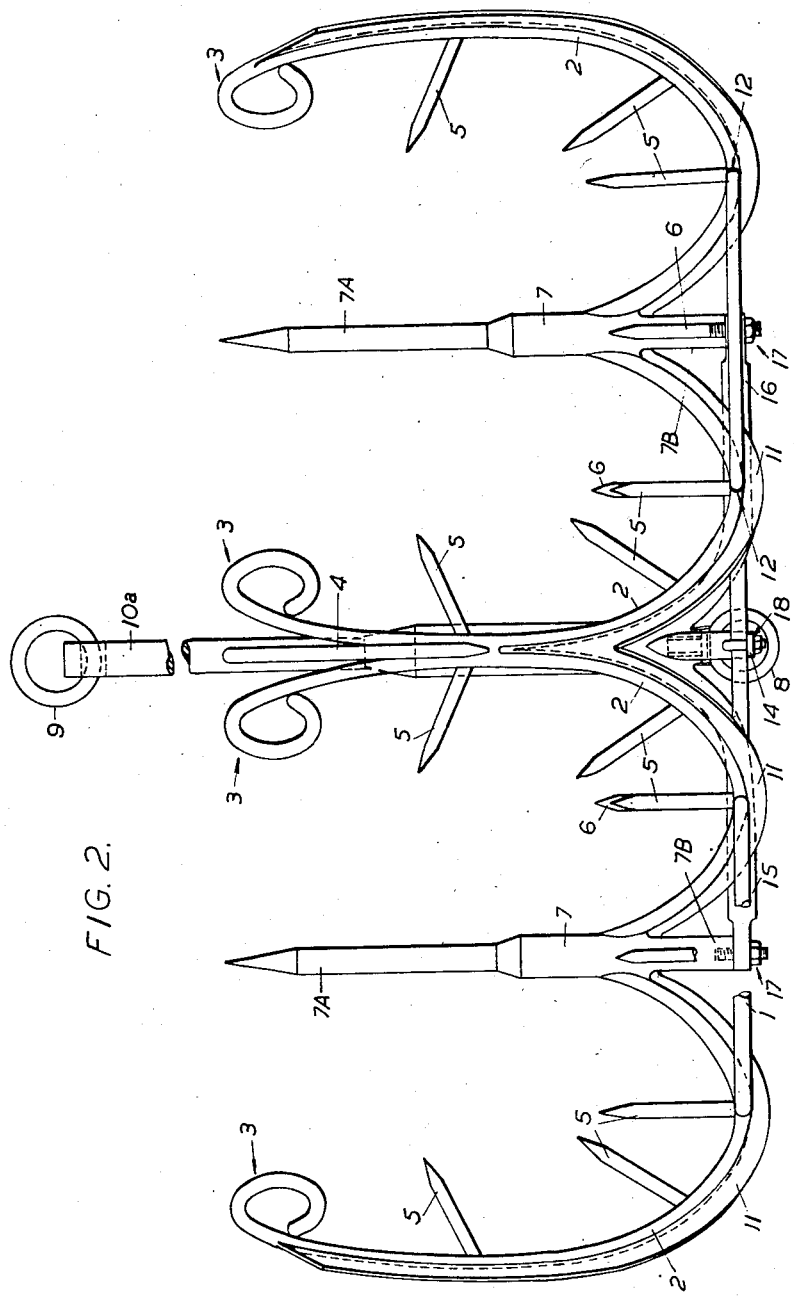
Fig. 2 is a plan view of the apparatus.
Figure 3:
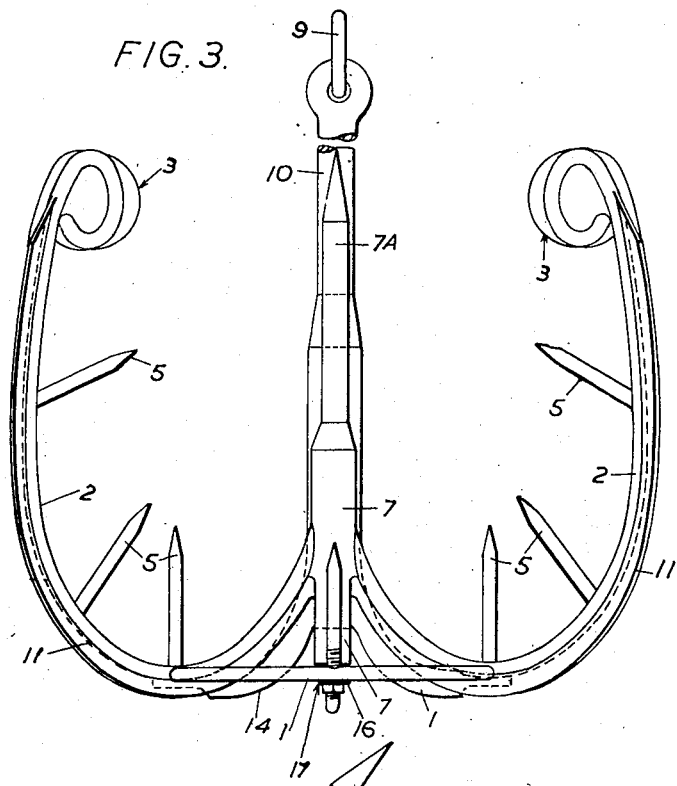
Fig. 3 is an end elevational view of the apparatus.
Figure 4:
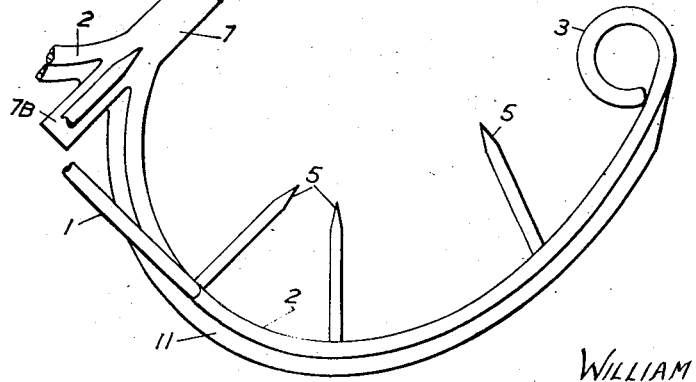
Fig. 4 is a fragmentary elevational view in the direction of the arrows IV of Fig. 1, and confined to the part of the apparatus bounded by said arrows.

Referring to the drawings, the apparatus consists of a rigid rectangular lattice frame 1 carrying a grapnel and skid construction A of double X formation in front view, there being four upper and four lower skids 2. Each of the lower skids is curved forwardly and upwardly towards the centre of its X and is bent around at its tip 3 in order to act as a skid which will not easily jam or foul obstructions on the sea bed. The lower skids 2 are thus arranged as two inverted V's located side by side. Where the inner or adjacent extremities of the two V's abut a fifth skid 4 is provided of similar construction but disposed in a vertical plane.

The four upper skids 2 are similar to the lower skids, but extend correspondingly in the opposite directions, as shown in Fig. 1.

The rectangular frame 1 is disposed symmetrically so as to brace the skids 2 rigidly together. Each skid 2 is provided with a plurality of substantially radially inwardly directed flukes or pointed pins 5, while at selected points on the frame further flukes 6 are provided. Each skid 2 of each set of four skids, which together form an X-formation, curves outwards and forwards from a central post 7, which is elongated forwardly to form a large fluke 7A, i. e., at the common apex of each of the upper and lower V's.

All the flukes point in a forward direction, and thus the whole apparatus forms a grapnel having skids which prevent or mitigate jamming or fouling on the sea bed, while being provided with a large number of flukes which pass between the plants and cause them to entwine on the grapnel, whereupon they are torn away from the sea bed.

A ring 8 for raising and lowering the apparatus is provided centrally at the rear, while a towing ring 9 is provided at the end of a forwardly extending post 10 which is located centrally of the frame.

In a preferred arrangement two apparatus, each as above described, are provided and two derricks are provided side by side on the vessel. Each derrick works alternately, one apparatus being dropped over one side of the vessel and its cable being passed over a fair lead on the stern of the vessel through which dragging is effected, and the other apparatus is raised to the surface from the sea bed for removal of the seaweed.

Preferably, the skids 2 are each provided with a reinforcing web 11.

The portions of the frame 1 are welded to the skids 2 at the points 12 (Fig. 1). The post 10 is formed at its inner end, that is the end remote from the towing ring 9, with four outwardly curved arms. Two of the arms 13 and 14 are located in a vertical plane and the other two arms 15 and 16 are located in a horizontal plane. The outer extremities of the arms 15 and 16 are secured to a lower extension 7B of the posts 7 at 17, and the outer extremities of the arms 13 and 14 are secured to the frame 1 by U-bolts at 18.

I claim:

1. Apparatus for harvesting under-water seaweed comprising, in combination, a frame, seabed-engaging skids rigidly mounted on said frame for downward and forward projection therefrom and curved back upon themselves at their ends remote from the frame in a direction away from the seabed to mitigate fouling of obstacles on the seabed, and fluke means mounted on said skids and adapted to engage the weed and tear it from the seabed, when the apparatus is dragged over the seabed with the frame in the trailing position.

2. Apparatus for harvesting under-water seaweed comprising, in combination, a frame, an upper and a lower set of skids rigidly mounted on said frame for downward and forward projection therefrom and upward and forward projection therefrom respectively, each of said upper and lower skids being curved inwardly back upon itself at its end remote from the frame, and fluke means mounted on said skids, whereby, when the apparatus is dragged over the seabed with one set of skids engaging the seabed and the frame in the trailing position, the leading ends of the skids of said set mitigate fouling of the apparatus on the seabed and said fluke means engages the weed and tear it from the seabed.

3. Apparatus for harvesting under-water seaweed comprising, in combination, a frame, seabed-engaging skids rigidly mounted on said frame for downward and forward projection therefrom and curved back upon themselves at their ends remote from the frame in a direction away from the seabed to mitigate fouling of obstacles on the seabed, and a plurality of flukes mounted on said skids for projection therefrom in a direction away from the frame and adapted to engage the weed and tear it from the seabed, when the apparatus is dragged over the seabed with the frame in the trailing position.

4. Apparatus for harvesting under-water seaweed comprising, in combination, a frame, an upper and a lower set of skids rigidly mounted on said frame for downward and forward projection therefrom and upward and forward projection therefrom respectively, each of said upper and lower skids being curved inwardly back upon itself at its end remote from the frame, and a plurality of flukes mounted on the skids of both said sets for projection therefrom in a direction away from the frame, whereby, when the apparatus is dragged over the seabed with one set of skids engaging the seabed and the frame in the trailing position, the leading ends of the skids of said set mitigate fouling of the apparatus on the seabed and said flukes engage the weed and tear it from the seabed.

5. Apparatus for harvesting under-water seaweed comprising, in combination, a frame, seabed-engaging skids rigidly mounted on said frame for downward and forward projection therefrom and curved back upon themselves at their ends remote from the frame in a direction away from the seabed to mitigate fouling of obstacles on the seabed, and a plurality of flukes mounted on said skids for projection therefrom in a direction away from the frame, and also on said frame for forward projection therefrom, said flukes being adapted to engage the weed and tear it from the seabed when the apparatus is dragged over the seabed with the frame in the trailing position.

6. Apparatus for harvesting under-water seaweed comprising, in combination, a frame, an upper and a lower set of skids rigidly mounted on said frame for downward and forward projection therefrom and upward and forward projection therefrom respectively, each of said upper and lower skids being curved inwardly back upon itself at its end remote from the frame, and a plurality of flukes mounted on the skids of both said sets for projection therefrom in a direction away from the frame, and also on said frame for forward projection therefrom, whereby, when the apparatus is dragged over the seabed with one set of skids engaging the seabed and the frame in the trailing position, the leading ends of the skids of said set mitigate fouling of the apparatus on the seabed and said flukes engage the weed and tear it from the seabed.

7. Apparatus for harvesting under-water seaweed comprising, in combination, a frame, an upper and a lower set of pairs of skids rigidly mounted on said frame for downward and forward projection therefrom and upward and forward projection therefrom respectively, each pair of skids of each set in conjunction with a pair of skids of the other set forming an X-formation and each skid of each X-formation curving outwardly and forwardly from a central post mounted for forward projection from said frame, each of said upper and lower skids being curved inwardly back upon itself at its end remote from the frame, and fluke means mounted on said skids, whereby, when the apparatus is dragged over the seabed with one set of skids engaging the seabed and the frame in the trailing position, the leading ends of the skids of said set mitigate fouling of the apparatus on the seabed and said fluke means engage the weed and tear it from the seabed.

8. Apparatus for harvesting under-water seaweed comprising, in combination, a vertical frame, two posts mounted centrally on said frame for forward projection therefrom and spaced apart laterally, four upper and four lower skids rigidly mounted on said frame for upward and forward projection therefrom and downward and forward projection therefrom respectively, said skids being arranged in two X-formations, each consisting of two upper and two lower skids and which each have one of said posts at its centre, each skid curving outwardly and forwardly of the frame from the central post of its formation and being curved inwardly back upon itself at its end remote from the frame, and a plurality of flukes mounted on said skids for projection therefrom in a direction away from the frame, whereby, when the apparatus is dragged over the seabed with one set of skids engaging the seabed and the frame in the trailing position, the leading ends of the skids of said set mitigate fouling of the apparatus on the seabed and said flukes engage the weed and tear it from the seabed.

9. Apparatus for harvesting under-water seaweed comprising, in combination, a vertical frame, two posts mounted centrally on said frame for forward projection therefrom and spaced apart laterally, four upper and four lower skids rigidly mounted on said frame for upward and forward projection therefrom and downward and forward projection therefrom respectively, said skids being arranged in two X-formations, each consisting of two upper and two lower skids and which each have one of said posts at its centre, each skid curving outwardly and forwardly of the frame from the central post of its formation and being curved inwardly back upon itself at its end remote from the frame, and a plurality of flukes mounted on said skids and on said posts for projection therefrom in a direction away from the frame, and on said frame for forward projection therefrom, whereby, when the apparatus is dragged over the seabed with one set of skids engaging the seabed and the frame in the trailing position, the leading ends of the skids of said set mitigate fouling of the apparatus on the seabed and said flukes engage the weed and tear it from the seabed.

10. Apparatus for harvesting under-water seaweed comprising, in combination, a frame, seabed-engaging skids rigidly mounted on said frame for forward projection therefrom and curved back upon themselves at their ends remote from the frame in a direction away from the seabed to mitigate fouling of obstacles on the seabed, a post extending forwardly from the centre of said frame and provided at its outer end with a towing ring, and fluke means mounted on said skids and adapted to engage the weed and tear it from the seabed, when the apparatus is dragged over the seabed with the frame in the trailing position.

11. Apparatus as claimed in claim 9, in which a post provided at its outer end with a towing ring is mounted centrally on said frame for forward projection therefrom intermediate the two X-formation curves formed by said skids.

WILLIAM MacKENZIE.

REFERENCES CITED

The following references are of record in the file of this patent:

UNITED STATES PATENTS

| Number | Name | Date |
|---|---|---|
| 1,703,402 | Matsuoka | Feb. 26, 1929 |
| 2,210,271 | Thwaits | Aug. 6, 1940 |